US012695266B2

(12) United States Patent
Nagano et al.

(10) Patent No.: US 12,695,266 B2
(45) Date of Patent: Jul. 28, 2026

(54) OPTICAL AMPLIFICATION TRANSMISSION LINE

(71) Applicants: SUMITOMO ELECTRIC INDUSTRIES, LTD., Osaka (JP); Sumitomo Electric Optifrontier Co., Ltd., Yokohama (JP)

(72) Inventors: Shigehiro Nagano, Osaka (JP); Takemi Hasegawa, Osaka (JP); Takahiro Suganuma, Osaka (JP); Hirotaka Sakuma, Osaka (JP); Jun Kinugasa, Yokohama (JP)

(73) Assignees: SUMITOMO ELECTRIC INDUSTRIES, LTD., Osaka (JP); Sumitomo Electric Optifrontier Co., Ltd., Yokohama (JP)

( * ) Notice: Subject to any disclaimer, the term of this patent is extended or adjusted under 35 U.S.C. 154(b) by 120 days.

(21) Appl. No.: 18/569,633

(22) PCT Filed: Apr. 14, 2023

(86) PCT No.: PCT/JP2023/015136
§ 371 (c)(1),
(2) Date: Dec. 13, 2023

(87) PCT Pub. No.: WO2023/210404
PCT Pub. Date: Nov. 2, 2023

(65) Prior Publication Data
US 2024/0275117 A1 Aug. 15, 2024

(30) Foreign Application Priority Data
Apr. 26, 2022 (JP) ................................. 2022-072525

(51) Int. Cl.
*H01S 3/067* (2006.01)
*H01S 3/16* (2006.01)

(52) U.S. Cl.
CPC ...... *H01S 3/06745* (2013.01); *H01S 3/06716* (2013.01); *H01S 3/1608* (2013.01)

(58) Field of Classification Search
CPC . H01S 3/06745; H01S 3/06716; H01S 3/1608
(Continued)

(56) References Cited
U.S. PATENT DOCUMENTS 5,058,976 A 10/1991 Digiovanni et al.
5,074,633 A 12/1991 Cohen et al.
(Continued)

FOREIGN PATENT DOCUMENTS

JP H04-253003 A 9/1992
JP H04-273187 A 9/1992
(Continued)

OTHER PUBLICATIONS

Pierluigi Poggiolini, "The GN Model of Non-Linear Propagation in Uncompensated Coherent Optical Systems", Journal of Lightwave Technology, vol. 30, No. 24, Dec. 15, 2012, p. 3857-p. 3879.
(Continued)

*Primary Examiner* — Daniel A Hess
(74) *Attorney, Agent, or Firm* — McDonald Hopkins LLC

(57) ABSTRACT

An optical amplification transmission line of the present disclosure reduces a connection loss between an EDF located upstream of a signal light path and a SMF located downstream of the path, as compared with a conventional optical amplification transmission lines. The optical amplification transmission line includes an EDF and a SMF fusion-spliced to each other. The EDF has an Er-doped core and an F-doped cladding. A core of the SMF is doped with no Er. The ratio (MFD2/MFD1) of the MFD2 of a stationary section of the SMF to the MFD1 of a stationary section of the EDF falls within a range of 1.9 or more and 2.2 or less.

6 Claims, 5 Drawing Sheets

(58) Field of Classification Search
USPC ...................................................... 359/341.5
See application file for complete search history.

(56)                          References Cited

U.S. PATENT DOCUMENTS

| | | | |
|---|---|---|---|
| 2001/0022879 A1 | 9/2001 | Wu | |
| 2002/0057877 A1 | 5/2002 | Sasaoka et al. | |
| 2005/0122574 A1 | 6/2005 | Kakui et al. | |
| 2009/0103171 A1 | 4/2009 | Haruna | |
| 2010/0177792 A1* | 7/2010 | Takenaga ........... | G02B 6/02366 |
| | | | 385/139 |
| 2019/0196104 A1* | 6/2019 | Ghiringhelli ...... | G02B 6/03611 |
| 2021/0011219 A1 | 1/2021 | Tsai | |

FOREIGN PATENT DOCUMENTS

| | | | |
|---|---|---|---|
| JP | H08-204257 | A | 8/1996 |
| JP | 2002-072006 | A | 3/2002 |
| JP | 2002-243971 | A | 8/2002 |
| JP | 2004-117965 | A | 4/2004 |
| JP | 2004-325863 | A | 11/2004 |
| JP | 2004-354809 | A | 12/2004 |
| JP | 2005-101590 | A | 4/2005 |
| WO | 2017/195636 | A1 | 11/2017 |

OTHER PUBLICATIONS

International Search Report issued in Patent Application No. PCT/JP2023/015136 dated Jun. 20, 2023.
"Corning SMF-28 optical fiber", Apr. 1, 2001, p. 1-p. 4.

* cited by examiner

*Fig.5*

| FUSION-SPLICING LOSS (CONNECTION LOSS) | | | |
|---|---|---|---|
| | EDF 100 + WDMF 300 | | EDF 100 + SMF 200 |
| | PUMPING LIGHT (0.98μm) | SIGNAL LIGHT S (1.55μm) | SIGNAL LIGHT S (1.55μm) |
| POINT B (REFERENCED TO POINT A) | +0.10% | -0.12% | -1.27% |

OPTICAL AMPLIFICATION TRANSMISSION LINE

TECHNICAL FIELD

The present disclosure relates an optical amplification transmission line.

This application is based upon and claims the benefit of priority from Japanese Patent Application No. 2022-072525, filed on Apr. 26, 2022, the entire contents of which are incorporated herein by reference.

BACKGROUND ART

Patent Document 1 discloses an Er-doped optical fiber amplifier (EDFA, hereinafter referred to as "EDFA"), in which an optical amplification Er-doped optical fiber (EDF, hereinafter referred to as "EDF") having a core doped with Ge (germanium), and a transmission optical fiber (SMF: single mode optical fiber, hereinafter referred to as "SMF") are arranged in order along a propagation direction of signal light. At a connection portion of the EDF and the SMF, both core diameters are matched because the core diameter is expanded by diffusion of a dopant contained in the core, preferably germanium (Ge), and therefore both of a mode field diameter (hereinafter referred to as "MFD") at a wavelength of pumping light and an MFD at a wavelength of signal light are matched therebetween.

Patent Document 2 discloses an EDF having a core diameter of 3.5 μm or less and an MFD of less than 5.0 μm at a pumping light wavelength. Non-Patent Document 1 also discloses an EDF having an amplification efficiency increased by doping a core with Al (aluminum) and increasing the relative refractive index difference of the core with respect to a cladding.

CITATION LIST

Patent Literatures

[Patent Document 1] Japanese Patent Application Laid-Open No. Hei 8-204257.
[Patent Document 2] Japanese Patent Application Laid-Open No. Hei 4-273187.
[Patent Document 3] Japanese Patent Application Laid-Open No. Hei 4-253003.

Non-Patent Literatures

[Non-Patent Document 1]: Pierluigi Poggiolini, JOURNAL OF LIGHTWAVE TECHNOLOGY, VOL. 30, NO. 24, Dec. 15, 2012 p. 3857.

SUMMARY OF INVENTION

The optical amplification transmission line of the present disclosure has an EDF as an amplification optical fiber and a SMF as a transmission optical fiber, which are fusion-spliced to each other. The EDF has a first end face, a second end face, a first core that extends from the first end face to the second end face and is doped with Er, and a first cladding that surrounds the first core and is doped with F (fluorine). The SMF propagates only single-mode light and has a third end face fusion-connected to the first end face, a fourth end face, a second core extending from the third end face to the fourth end face without being doped with Er, and a second cladding surrounding the second core. The EDF also has a first MFD, and the EDF further has a transition section which includes a first end face and in which the first MFD decreases from the first end face toward the second end face, and a first stationary section. The first stationary section is a portion communicating the transition section and the second end face, and a composition of the EDF and MFD1 serving as the first MFD of the first stationary section are constant from the transition section toward the second end face. On the other hand, in a second stationary section of the SMF, a composition of the SMF and MFD2 serving as a second MFD of the second stationary section are constant from the third end face to the fourth end face. In particular, the ratio (MFD2/MFD1) of the MFD2 of the second stationary section to the MFD1 of the first stationary section falls within the range of 1.9 or more and 2.2 or less.

BRIEF DESCRIPTION OF DRAWINGS

FIG. 5 is a view showing a fusion splicing loss as an optical characteristic at each fusion splicing point in the optical amplification transmission line.

DESCRIPTION OF EMBODIMENTS

Problems to be Solved by Invention

Figure 1:
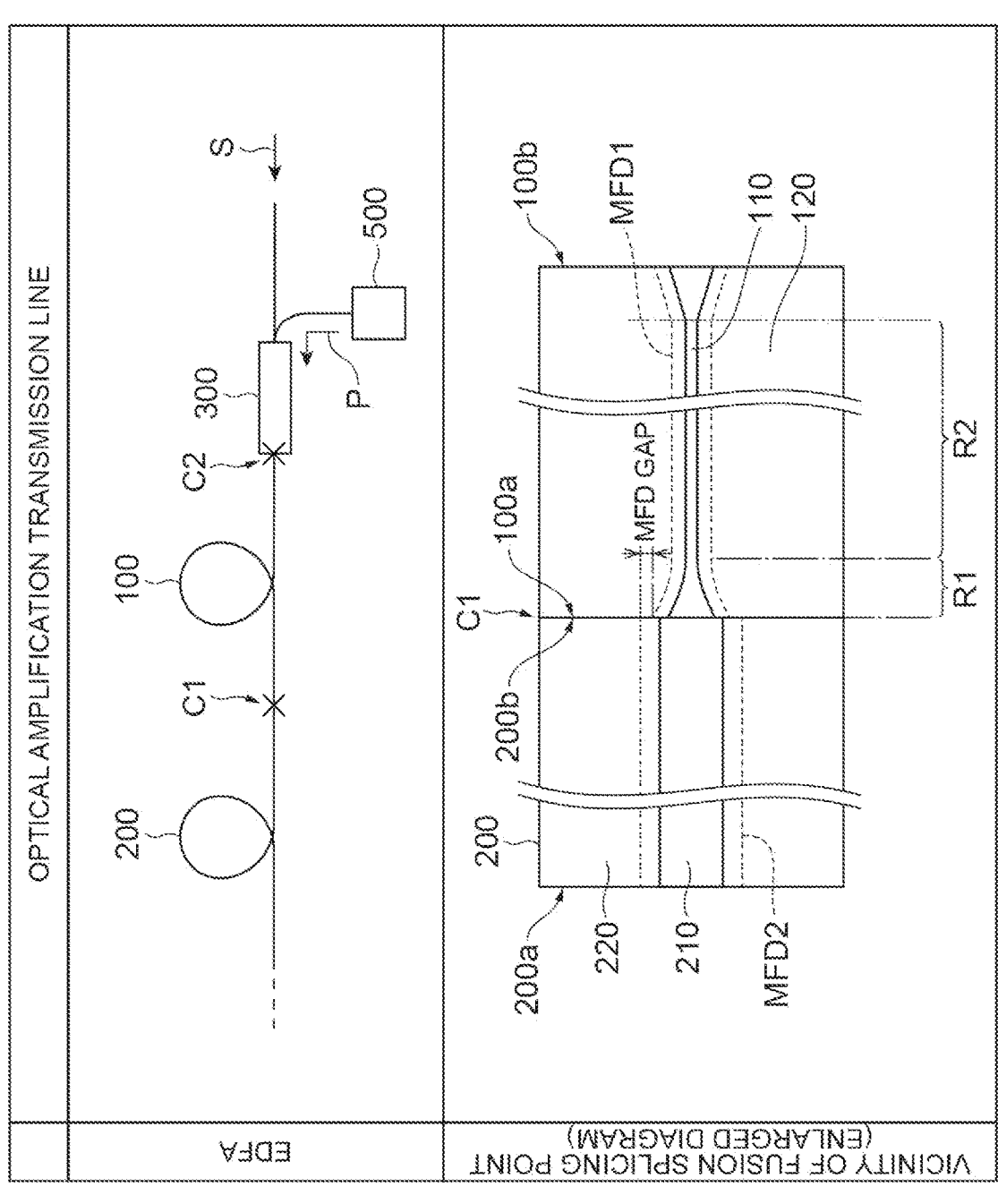
FIG. 1 is a view showing an optical amplification transmission line of the present disclosure and an optical fiber amplifier including the same.

The inventors have examined the above-mentioned conventional technologies and found the following problems. Namely, in the optical amplification transmission lines disclosed in Patent Document 1 and Patent Document 2, the difference in a core diameter and a difference between an MFD at a pumping wavelength of 0.98 μm and an MFD at a communication wavelength of 1.55 μm (hereinafter referred to as "wavelength-to-wavelength MFD difference") become causes of a connection loss when connecting an EDF to another optical fiber. Therefore, these Patent Document 1 and Patent Document 2 propose, as a method of reducing the connection loss between two optical fibers constituting an optical amplification transmission line, a method of suppressing the wavelength-to-wavelength MFD difference at the fiber end faces caused by the thermal diffusion of dopant in the core by matching the α values (V·λ) obtained from the V values ($2\pi/\lambda \cdot a \cdot n1 \cdot (2\Delta)^{1/2}$) serving as normalized frequencies of the two optical fibers including the EDF. However, with respect to the suppression of the connection loss between two optical fibers constituting the optical amplification transmission line, matching the α values may be a cause of loss increase. In addition, the conditions shown in Patent Document 1 may be an obstacle in increasing the amplification efficiency of the EDF because the core diameter and the relative refractive index difference of the EDF are strongly constrained.

With respect to MFD expansion, Patent Document 1 discloses diffusing dopant, preferably Ge doped into the core of the EDF (see paragraph "0006" and paragraph "0007") and diffusing F (fluorine) doped into the optical cladding (see paragraph "0021"), in order to match MFDs of these two optical fibers at a connection portion of the EDF and the other optical fiber located downstream of it. Non-Patent Document 1 also discloses an EDF in which the amplification efficiency is enhanced by doping the core with Al and increasing the relative refractive index difference. However, an Al-doped EDF has a characteristic that an MFD easily expands as compared with the other optical fiber because Al is easily diffused. Furthermore, reducing the amount of Ge doped into the core relatively while lowering the refractive index of the cladding by doping the cladding with F is effective in reducing the polarization mode dispersion (hereinafter referred to as "PMD") caused by residual stress and hydrogen loss increase caused by Ge doping. However, F doped into the cladding can easily further expand the MFD. Therefore, when connecting the other optical fiber with an EDF having a core coped with Er and Al, and a cladding doped with F, the use of the technique disclosed in Patent Document 1 becomes a cause of connection loss increase.

Also, Patent Document 2 discloses an EDF having a relative refractive index difference Δ of 2% or more (i.e., a refractive index difference Δn of 0.03 or more), a core diameter of 3.5 μm or less, and an MFD at a pumping wavelength of 5.0 μm or less. In addition, Patent Document 2 and Patent Document 3 show the use of a tapered splicer to couple this EDF with a SMF serving as a transmission optical fiber. In the tapered splicer that couples the EDF with an MFD of about 4 μm or less and the SMF with an MFD of about 6 μm or more, the core diameter of the EDF increases as it approaches the fusion splicing point, and a taper length of the EDF is about 0.5 mm or more and about 5 mm or less. However, it was actually difficult to reduce the connection loss to 0.05 dB or less.

Furthermore, Non-Patent Document 1 points out that nonlinearity in the EDF increases as the MFD is reduced. Specifically, when the MFD is reduced below about 4.8 μm, signal degradation due to nonlinearity is considered non-negligible.

The purpose of the present disclosure is to provide an optical amplification transmission line with a structure to reduce the connection loss between the EDF located upstream of the signal light path and the SMF located downstream of the path, as compared with conventional optical amplification transmission lines.

Effects of Invention

The optical amplification transmission line of the present disclosure enables a splicing loss between an EDF and a SMF to be reduced as compared with conventional optical amplification transmission lines.

Description of Embodiments of the Present Disclosure

First, each correspondence of embodiments of the present disclosure will be individually listed and described.

In an optical amplification transmission line of the present disclosure, (1) an EDF serving as an amplification optical fiber and a SMF serving as a transmission optical fiber are arranged in order along a propagation direction of signal light, and the EDF and the SMF are fusion-spliced so that the signal light amplified in the EDF propagates through the SMF. The EDF has a first end face, a second end face, a first core extending from the first end face to the second end face and being doped with Er, and a first cladding surrounding the first core and being doped with F. The SMF propagates only single-mode light and has a third end face fusion-spliced to the first end face, a fourth end face, a second core extending from the third end face to the fourth end face without being doped with Er, and a second cladding surrounding the second core. The EDF also has a first MFD, and the EDF further has a transition section which includes the first end face and in which the first MFD decreases from the first end face toward the second end face, and a first stationary section. The first stationary section communicates the transition section and the second end face, and a composition of the EDF and MFD1 serving as the first MFD are constant from the transition section toward the second end face. On the other hand, in a second stationary section of the SMF, a composition of the SMF and MFD2 serving as a second MFD are constant from the third end face toward the fourth end face. In particular, the ratio (MFD2/MFD1) of the MFD2 of the second stationary section to the MFD1 of the first stationary section is 1.9 or more and 2.2 or less. In this specification, "state of constant MFD" means a state in which the fluctuation of MFD along a longitudinal direction of the optical fiber falls within the range of (design value –0.1) μm to (design value +0.1) μm, with reference to a design value of MFD at a specific wavelength.

According to the optical amplification transmission line of the present disclosure, at the fusion splicing point of the EDF and the SMF, a significant gap (hereinafter referred to as "MFD gap") is formed between the mode field diameters of the EDF and the SMF even by the expansion of MFD on the EDF side. Such a transmission line structure enables effective reduction of connection loss in the propagation of signal light from the EDF side to the SMF side.

(2) In the above-mentioned (1), the core of the EDF may be doped with Ge and Al. In this case, it is possible to realize a structure that makes it possible to suppress the increase of nonlinearity in the EDF.

(3) In the above-mentioned (2), in a 1.55 μm wavelength band, the MFD1 may be 5.3 μm or less. By strengthening light confinement within the first core, the amplification efficiency can be increased. Furthermore, the increase of nonlinearity and PMD due to the high relative refractive index difference can be effectively suppressed.

(4) In the above-mentioned (2), in the first core, the concentration of Ge may be 3.8% or less by mass fraction, and the concentration of Al may be 4.0% or more by mass fraction. The upper limit of concentration of Al may be 5.0% or less by mass fraction. Thus, good polarization mode dispersion (PMD) can be achieved by setting the Ge concentration in the first core to a mass fraction of 3.8% or less. Since the nonlinear coefficient of Ge is higher than that of Al, suppressing the Ge concentration is effective for nonlinear suppression. Since the MFD in the stationary section of the EDF should be 5.3 μm or less, the nonlinearity in the EDF tends to increase. However, the Ge concentration can be suppressed by adopting the F-doped cladding. In other words, the relative refractive index difference of the core to the cladding can be sufficiently secured.

More specifically, when an MFD of a conventional EDF at a 1.55-μm band (hereinafter referred to as "MFD_EDF") is 5.7 μm and an MFD in the 1.55-μm band (hereinafter referred to as "MFD_SMF") of a standard SMF different from the above-mentioned transmission optical fiber is 10.5

μm, the ratio (MFD_SMF/MFD_EDF) of the MFD_SMF to the MFD_EDF is 1.84. In contrast, in the case of a heavily Al-doped EDF applied to the optical amplification transmission line of the present disclosure, the MFD in the 1.55-μm band (hereinafter referred to as "MFD_Al,EDF") is 5.0 μm, and the difference with MFD_SMF is rather large as compared with that of the conventional EDF (MFD_SMF/MFED_Al,EDF=2.18). At first glance, this was considered to be unfavorable for controlling the connection loss at the fusion-splicing point. However, a fusion-splicing loss of the optical amplification transmission line, constituted by the heavily Al-doped EDF of the present disclosure and the SMF which are fusion-spliced, is improved to the state of 0.02 dB or more and 0.05 dB or less, as compared with the fusion splicing loss of the optical amplification transmission line constituted by the conventional EDF and the SMF. Here, the fusion splicing loss means a connection loss at the fusion splicing point. This indicates that the EDF applied to the optical amplification transmission line of the present disclosure can fully contribute to higher efficiency of optical amplification. In the heavily Al-doped EDF, the MFD can be more easily expanded than the MFD of the SMF having the core doped with Ge by doping the core with Ge and Al and doping the first cladding with F. Therefore, in the optical amplification transmission line of the present disclosure, by making the MFD of the EDF smaller in advance, the MFD of the EDF after being expanded by fusion splicing matches the MFD of the SMF, or the MFD gap is actively formed between the EDF and the SMF.

(5) In the above-mentioned (2), the MFD1 may be 5.3 μm or less in a 1.55-μm wavelength band. In this case, the amplification efficiency can be increased by strengthening the light confinement in the first core. Furthermore, the increase of nonlinearity and PMD due to the high relative refractive index difference is effectively suppressed.

(6) In any one of the above-mentioned (2) to (5), in the EDF, the relative refractive index difference of the first core to the first cladding may be 1% or more and 2% or less. In this case, the amplification efficiency can also be increased by enhancing the light confinement in the first core. Furthermore, the increase of nonlinearity and PMD due to the high relative refractive index difference is effectively suppressed.

As described above, each aspect listed in this field of [Description of embodiments of the present disclosure] is applicable to one of all the remaining aspects, or to all combinations of these remaining aspects.

DETAILS OF EMBODIMENTS OF THE PRESENT DISCLOSURE

Hereinafter, an optical amplification transmission line of the present disclosure will be described in detail with reference to the accompany drawings. The present invention is not limited to these examples, but is defined by the scope of the claims, and is intended to include meanings equivalent to the scope of the claims and all modifications within the scope. In addition, the same elements will be denoted by the same reference signs in the description of the drawings, without redundant description.

FIG. 1 shows an optical amplification transmission line of the present disclosure and an optical fiber amplifier including the same (indicated as "optical amplification transmission line" in FIG. 1). The upper part of FIG. 1 (indicated as "EDFA" in FIG. 1) shows the structure of an Er-doped fiber amplifier to which the optical amplification transmission line of the present disclosure is applied. The lower part of FIG. 1 (indicated as "vicinity of fusion splicing point (enlarged diagram)" in FIG. 1) shows the cross-sectional structures of an EDF 100 and an SMF 200 in the vicinity of the fusion splicing point C1.

The EDFA shown in the upper part of FIG. 1 has the optical amplification transmission line of the present disclosure. Specifically, the EDF 100 and the SMF 200 are arranged in order along the propagation direction of the signal light S. The EDF 100 and the SMF 200 are fusion-spliced at the fusion splicing point C1 which is indicated by C1. A wavelength division multiplexing filter (WDMF) 300, which functions as a coupler constituted by a SMF, is located upstream to the EDF 100. At the fusion splicing point C2, which is a position indicated by C2, the optical output end face of the WDMF 300 is connected to the optical input end face 100b of the EDF 100, and light inputted from the optical input end face of the WDMF 300, namely the pumping light P outputted from a pumping light source 500 and the signal light S, is outputted to the EDF 100.

The optical amplification transmission line of the present disclosure, shown in the lower part of FIG. 1, has the EDF 100 disposed upstream of the propagation path and the SMF 200 disposed downstream of the propagation path. The EDF 100 has an optical output end face 100a serving as a first end face, an optical input end face 100b serving as a second end face, a core 110, and a cladding 120. The SMF 200 has an optical output end face 200a serving as a fourth end face, an optical input end face 200b serving as a third end face, a core 210, and a cladding 220. The optical output end face 100a of the EDF 100 and the optical input end face 200b of the SMF 200 are fusion-spliced at the fusion splicing point C1, and this fusion splicing forms a transition section R1 and a stationary section R2 in the EDF 100. The transition section R1 of the EDF 100 includes the optical output end face 100a and is a portion where the MFD decreases from the optical output end face 100a to the optical input end face 100b. The stationary section R2 of the EDF 100 is a portion that communicates the transition section R1 and the optical input end face 100b, where the composition of the EDF 100 and the MFD1 are constant. On the other hand, the stationary section of the SMF 200 has a constant composition of the SMF 200 and the MFD2 from the optical input end face 200b to the optical output end face 200a. In particular, the ratio (MFD2/MFD1) of the MFD2 in the stationary section of the SMF to the MFD1 in the stationary section of the EDF falls within the range of 1.9 or more and 2.2 or less. Therefore, in the optical amplification transmission line of the present disclosure, an MFD gap is formed at the fusion splicing point C1. The "state of constant MFD" includes an abbreviated constant with measurement errors and differences within an acceptable range, and specifically means a state in which the MFD falls within the range of (design value −0.1) μm or more and (design value +0.1) μm or less with respect to a design value of the MFD.

Figure 2:
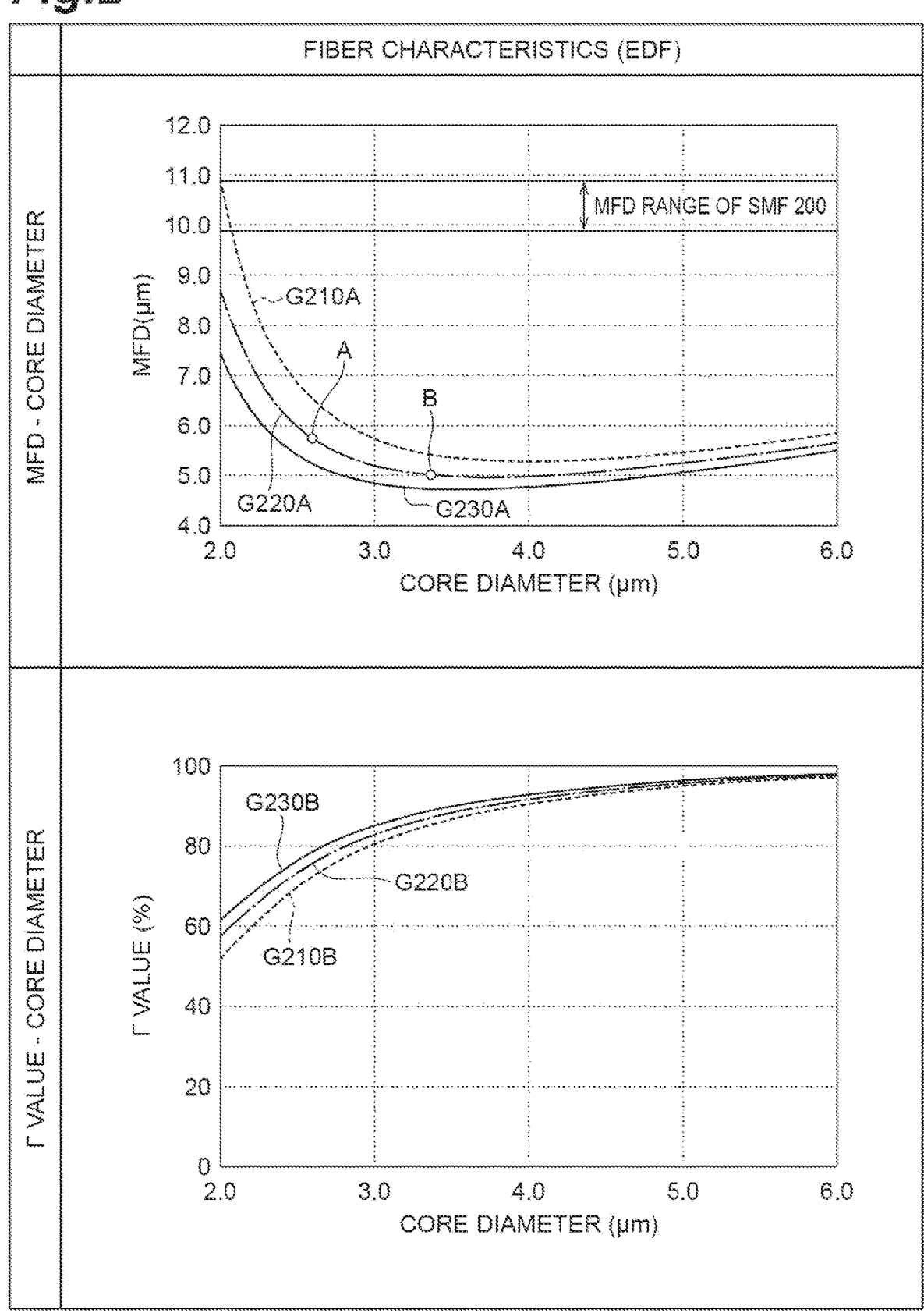
FIG. 2 is a view showing various fiber characteristics of an EDF serving as an Er-doped optical fiber.

FIG. 2 shows various fiber characteristics of EDF (indicated as "Fiber Characteristics (EDF)" in FIG. 2). The upper part of FIG. 2 (indicated as "MFD—core diameter" in FIG. 2) shows a graph showing the dependence of MFD on core diameter for various EDFs with different relative refractive index differences Δ. The lower part of FIG. 2 (indicated as "Γ value—core diameter" in FIG. 2) shows a graph showing the core diameter dependence of Γ value for various EDFs with different relative refractive index differences Δ.

More specifically, in the upper part of FIG. 2, graph G210A shows the calculated results of the MFD in the 1.55 μm-band relative to the core diameter, in the EDF where the relative refractive index difference Δ of the core to the optical cladding is 1.25%. Graph G220A shows the calculated results of the MFD in the 1.55 μm-band relative to the core diameter, in the EDF where the relative refractive index difference Δ is 1.41%. Graph G230A shows the calculated results of the MFD in the 1.55 μm-band relative to the core diameter, in the EDF where the relative refractive index difference Δ is 1.55%. The point A in the upper part of FIG. 2 indicates the calculated result of the conventional EDF, and the point B indicates the calculated result of the EDF applied to the optical amplification transmission line of the present disclosure, i.e., the EDF having the core doped with Ge and Al, and the cladding doped with F. The upper part of FIG. 2 also shows, as a reference, that the MFD of the SMF is 9.9 μm or more and 10.9 μm or less at the wavelength of 1.55 μm.

In the lower part of FIG. 2, Graph G210B shows the calculated results of the Γ value, which is the overlap integral between the light intensity distribution of the LP01 mode serving as the fundamental mode of the pumping light at the 0.98 μm-band and the inside of the Er-doped core region, in the EDF where the relative refractive index difference Δ of the core to the optical cladding is 1.25%. Graph G220B shows the calculated results of the Γ value between the light intensity distribution of the LP01 mode of the pumping light at the 0.98 μm-band and the inside of the Er-doped core region, in the EDF where the relative refractive index difference Δ is 1.41%. Graph G230B shows the calculated results of the Γ value between the light intensity distribution of the LP01 mode of the pumping light at the 0.98 μm-band and the inside of the Er-doped core region, in the EDF where the relative refractive index difference Δ is 1.55%.

The Γ value is normalized on the basis of the total intensity of the LP01 mode of the pumping light at the 0.98 μm-band. The index of high efficiency of the EDFA is power conversion efficiency (PCE), and the increase of the Γ value is effective. Increasing the core diameter is effective in this regard, but the noise factor (NF) increases, so an appropriate core diameter is necessary. The power conversion efficiency is a ratio of the amount of pumping light to the amount of signal light obtained from the EDF, and is given by the following equation:

$$PCE = (P1 - P2)/P3 \times 100[\%].$$

where P1 is the amount of signal light outputted from the EDF, P2 is the amount of signal light inputted to the EDF, and P3 is the amount of pumping light inputted to the EDF. The noise factor is expressed as the ratio between SN1 serving as a signal-to-noise ratio of input signal light and SN2 serving as a signal-to-noise ratio of output signal light.

Although it was concerned that the increase of the Γ value would worsen the noise factor, it was confirmed that the increase was negligible, being only 0.2% as compared with the conventional value. Based on the above, the Γ value, namely the overlap ratio, of 85% or more is effective, and therefore the MFD of the EDF of 5.3 μm or less is effective. In view of the deterioration of the noise factor, the upper limit is less than 90%.

In the EDF at the point A shown in the upper part of FIG. 2 as an example of the fiber structure of the conventional EDF, the Γ value was 76%. Although the increase of the Γ value is necessary for higher efficiency of the EDF, an appropriate Γ value setting is necessary because it is concerned that the noise factor may increase. Therefore, as a heavily Al-doped EDF applied to the optical amplification transmission line of the present disclosure, an EDF sample having, at the point B shown in the upper part of FIG. 2, a relative refractive index difference Δ of the core to the optical cladding of 1.41% which is the same value as that of the conventional EDF, a Γ value of 86%, and a core diameter of 3.5 μm was produced experimentally, and then the relative changes in PCF and noise factor of the heavily Al-doped EDF were evaluated with reference to the PCE and the noise factor at the point A. The PCE at the point B increased by 4% as compared with that of the conventional EDF, indicating that the heavily Al-doped EDF is effective. On the other hand, significant increase of the noise factor at the point B was concerned, but in fact the increase was found to be negligible, being only 0.2% as compared with that of the conventional EDF.

On the other hand, as a design guideline for a conventional EDF, Patent Document 1 suggests that the α value (V·λ) obtained from the V value ($=2\pi/\lambda \cdot a \cdot n1 \cdot (2\Delta)^{1/2}$) should be matched for both an EDF and a SMF. This is effective in suppressing fusion splicing loss (connection loss at the fusion splicing point) at the input end side of the EDF at both wavelengths of pumping light and signal light different from each other. However, with respect to suppressing the fusion splicing loss between the EDF and the SMF at the wavelength of signal light on the optical output end face side of the EDF, Patent Document 1 only discloses that the MFD with the SMF is matched by thermal diffusion of dopant in the core, without any detailed provisions (see paragraph "0022"). As a design policy to suppress fusion splicing loss between different optical fibers, such as EDF and SMF, it is effective that MFD_SMF and MFD_EDF are identical, i.e., MFD_SMF/MFD_EDF is 1. As shown in FIG. 2, the conventional EDF is effective because the smaller the core diameter, the smaller the difference with respect to MFD_SMF of the SMF, and consequently the tapered waveguide length can be shortened by thermal diffusion of dopant through fusion splicing. On the other hand, as mentioned above, the increase of the Γ value is necessary to improve PCE, and the increase of the fusion splicing loss is concerned because MFD_SMF/MFD_EDF increases when the core diameter is increased from 2.5 μm to 3.5 μm. In addition, in Patent Document 2, the viscosity of the $SiO_2$ base tube of MCVD, which serves as the outer cladding, is higher than that of the core, and the difference in viscosity is large. Therefore, when the outer cladding was softened so that sufficient connection strength could be obtained, the viscosity of the inner core was too low, and the excessive expansion of the MFD and deformation of the core increased the connection loss due to excessive diffusion of dopant.

In contrast, in the EDF 100 serving as the heavily Al-doped EDF applicable to the optical amplification transmission line of the present disclosure, the viscosity difference between the core and the cladding can be reduced as compared with the conventional case of Patent Document 2 by utilizing $SiO_2$ in which F is doped in the entire cladding. Therefore, although it is suitable for reducing the connection loss, the increase of the difference between the MFD of the EDF and that of the SMF was expected to lead to the increase of the fusion splicing loss.

In fusion splicing, the MFD_EDF of the conventional EDF is not larger than the MFD_SMF of the SMF, but to bring this MFD_EDF closer to the MFD_SMF, it is effective to dope the optical cladding with F and dope the core with Al instead of Ge. The Al concentration should effectively be 4.0% or more and 5.0% or less by mass fraction. As a secondary effect, the nonlinear coefficient of Al is halved as compared with that of Ge, so higher concentration of Al can suppress unwanted nonlinearities.

From the above, as the Γ value increases, i.e., as the core diameter increases, the EDF has an advantage over PCE, but, as shown in FIG. 2, it is expected to be a trade-off between the suppression of the fusion splicing loss and the efficiency of optical amplification in the EDF. Although the increase of the core diameter is effective for PCE, care should be taken in setting a lower limit of the MFD from the viewpoint of nonlinear noise. The nonlinear coefficient γ is given by the following equation:

$$\gamma = 2\pi/\lambda \cdot n2/Aeff,$$

where n2 is the nonlinear refractive index, λ is the wavelength, and Aeff is the effective area. The n2 in heavily Al-doped EDF is about 2.6.

Figure 3:
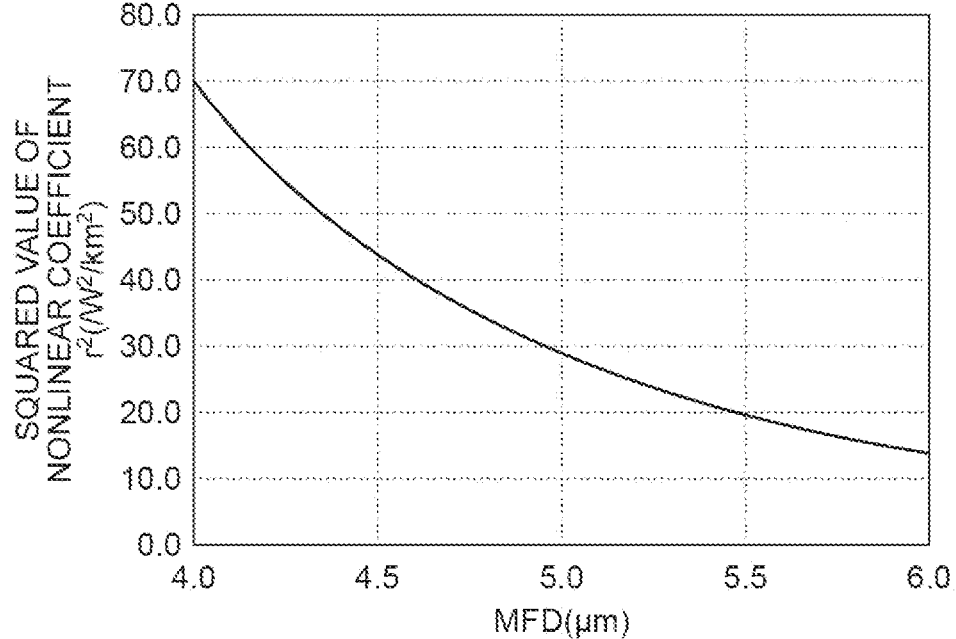
FIG. 3 is a graph showing the relationship between an MFD and a square value of the nonlinear coefficient $\gamma^2$ ($/W^2/km^2$).

Next, the generation efficiency P_pump of Four-Wave Mixing (FWM), which is one of the nonlinear phenomena occurring in optical fibers, is proportional to $\gamma^2$, and therefore, the square value of the nonlinear coefficient $\gamma^2$ [/W²/km²] to the MFD in the 1.55 μm wavelength band was calculated. FIG. 3 is a graph showing the relationship between the MFD and the squared value of the nonlinear coefficient $\gamma^2$ [/W²/km²].

From the viewpoint of nonlinear response characteristics in an optical fiber transmission system, one guideline is that the square value of the nonlinear coefficient $\gamma^2$ should be 30.0 or less. As can be seen from FIG. 3, the MFD at $\gamma^2$=30.0 is 4.95 μm, so the lower limit of the MFD is appropriate at 5.0 μm. The SMF is defined by that the MFD in the 1.55 μm wavelength band falls within the range of −0.5 μm or more and +0.5 μm or less with reference to 10.4 μm, that an outer diameter falls within the range of −0.7 μm or more and +0.7 μm or less with reference to 125.0 μm, and that a core eccentricity is 0.5 μm or less.

Figure 4:
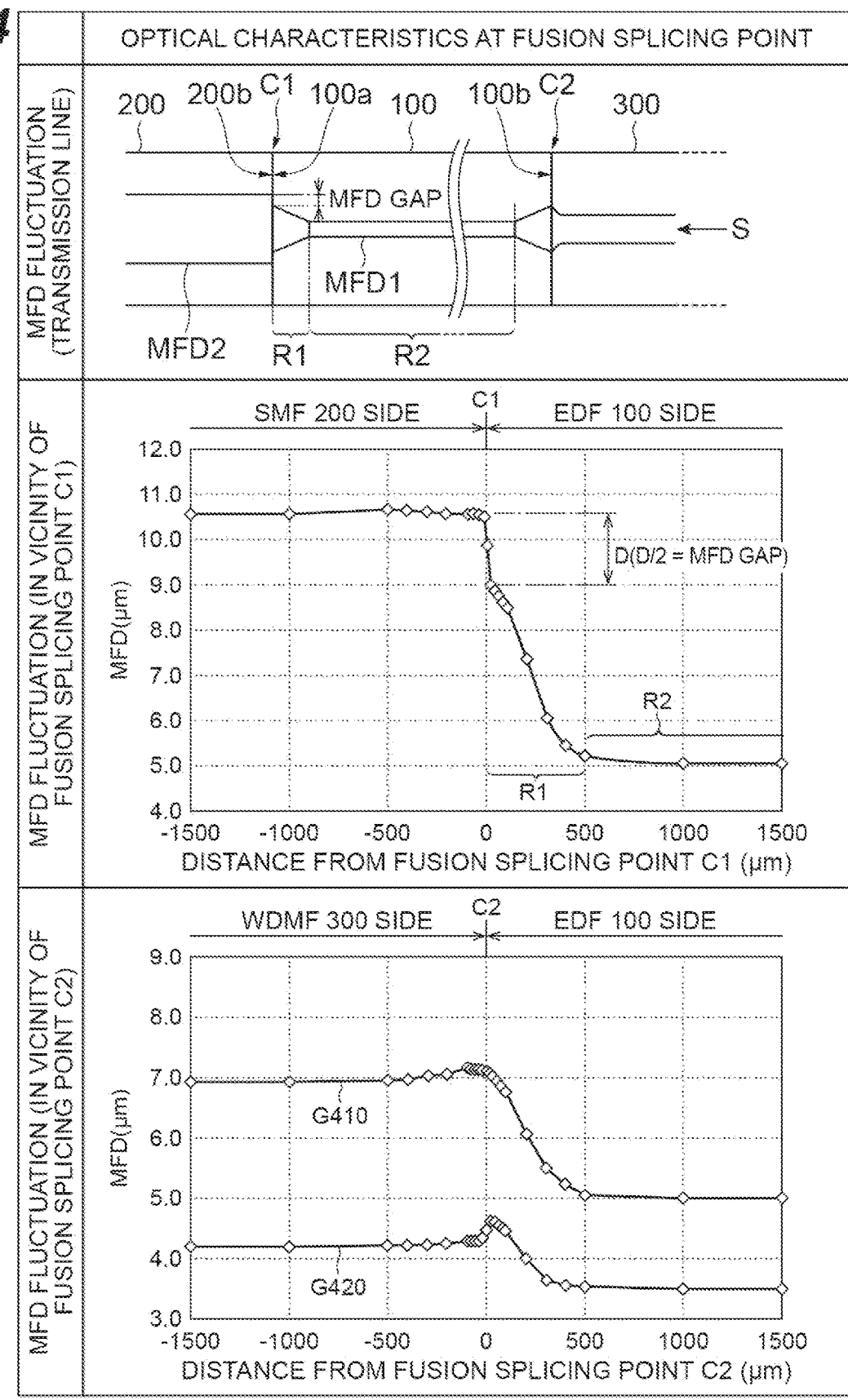
FIG. 4 is a view showing the state of change of an MFD as an optical characteristic at each fusion splicing point in the optical amplification transmission line.

In order to clarify the relationship between the increase of core diameter and the lower limit of MFD, the fusion splicing loss between the EDF and a heterogeneous fiber each constituting the EDFA was examined. Specifically, as a heterogeneous fiber in the EDFA, the SMF to be connected to an optical output end face of the EDF and the SMF functioning as a wavelength division multiplexing filter (WDMF) to be connected to an input end are examined, and the fusion splicing loss to each of the conventional EDF and the heavily Al-doped EDF applicable to the optical amplification transmission line of the present disclosure was evaluated. FIG. 4 is a view showing the state of change of an MFD as an optical characteristic at each fusion splicing point in the optical amplification transmission line (indicated as "optical characteristics at fusion splicing point" in FIG. 4). The upper part of FIG. 4 (indicated as "MFD fluctuation (transmission line)" in FIG. 4) shows the outline of the MFD fluctuation within each of a transmission line in the vicinity of the fusion splicing point C1 and a transmission line in the vicinity of the fusion splicing point C2. The middle part of FIG. 4 (indicated as "MFD fluctuation (in vicinity of fusion splicing point C1)" in FIG. 4) shows the MFD fluctuation in the vicinity of the fusion splicing point C1. The lower part of FIG. 4 (indicated as "MFD fluctuation (in vicinity fusion splicing point C2)" in FIG. 4) shows the MFD fluctuation in the vicinity of the fusion splicing point C2. FIG. 5 also shows the fusion splicing loss between the EDF 100 and the WDMF 300 at the fusion splicing point C2 and between the EDF 100 and the SMF 200 at the fusion splicing point C1.

Specifically, the upper part of FIG. 4 shows the optical amplification transmission line in which the SMF 200 having the MFD of 10.5 μm in the 1.55 μm band, the EDF 100 serving as a heavily Al-doped EDF, and the WDMF 300 are fusion-spliced at the fusion splicing point C1 and the fusion splicing point C2. At the fusion splicing point C1, the optical input end face 200b of the SMF 200 and the optical output end face 100a of the EDF 100 are fusion-spliced to each other. At the fusion splicing point C2, the optical input end face 100b of the EDF 100 and the optical output end face of the WDMF 300 are fusion-spliced to each other. The signal light S passes through the WDMF 300, the EDF 100, and the SMF 200 in that order. In the upper part of FIG. 4, MFD2 is the MFD in the stationary section of the SMF 200, and MFD1 is the MFD in the stationary section R2 of the EDF 100. In the transition section R1 of the EDF 100, the MFD decreases from the optical output end face 100a to the optical input end face 100b, and the MFD gap is formed at the fusion splicing point C1.

The middle part of FIG. 4 shows, in the optical amplification transmission line described above, the result obtained by measuring of the refractive index profile of each optical fiber in the range from −1500 μm to +1500 μm while setting the fusion splicing point corresponding to the fusion splicing point C1 shown in the upper part of FIG. 4 at 0 μm as a reference, and then calculating the MFDs in the 1.55 μm wavelength band from the measured refractive index profiles. The positive region on the horizontal axis indicates the side from 0 μm indicating the fusion splicing point to the EDF 100, and the negative region on the horizontal axis indicates the side from 0 μm indicating the fusion splicing point to the SMF 200. As can be seen from the middle part of FIG. 4, the fluctuation of the MFD1 of 5.0 μm increases by about +0.1 μm from +1000 μm to +500 μm, in the stationary section R2 of the EDF 100. In the transition section R1 from near +500 μm to 0 μm, it increases to about 10.5 μm toward the fusion splicing point C1 and then becomes equivalent to the MFD2 in the stationary section of the SMF 200. On the other hand, the MFD2 in the stationary section of the SMF 200 was found to be 10.5 μm and almost unchanged at the fusion splicing point C1.

When the above results are organized in terms of the relationship of MFD_SMF/MFD_EDF, the ratio of the MFD_SMF to the MFD_EDF of 5.7 μm was 1.84, and the ratio of the MFD_SMF to the MFD_EDF of 5.0 μm was 2.10. Setting the fusion splicing loss when a ratio of the MFD_SMF to the MFD_EDF of 5.7 μm is 1.84 as a reference, the fusion splicing loss is improved by 1.27% when the ratio of the MFD_SMF to the MFD_EDF of 5.0 μm is 2.10. It was thought that a smaller MFD_SMF/MFD_EDF would suppress the fusion splicing loss, but it turns out that a larger MFD_SMF/MFD_EDF is rather more effective. Furthermore, when the MFD_EDF1 of the EDF corresponding to the point A shown in the upper part of FIG. 2 and having a relative refractive index difference Δ of 1.41% and a core diameter of 2.5 μm is 6.0 μm, and the MFD_SMF is 9.9 μm or more and 10.9 μm or less, the ratio of the MFD_SMF to the MFD_EDF1 is 1.65 or more and 1.82 or less.

On the other hand, when the MFD_EDF2 of the EDF corresponding to the point B shown in the upper part of FIG. 2 and having a relative refractive index difference Δ of 1.41% and a core diameter of 3.5 μm is 5.0 μm, and the MFD_SMF is 9.9 μm or more and 10.9 μm or less, the ratio of the MFD_SMF to the MFD_EDF2 is 1.98 or more and 2.18 or less. Therefore, the range of the ratio (MFD_SMF1/MFD_EDF2) related to the heavily Al-doped EDF applicable to the optical amplification transmission line of the present disclosure was found to tend to be higher than the range of the ratio (MFD_SMF/MFD_EDF1) related to the conventional EDF.

The view shown in the lower part of FIG. 4 shows, in the optical amplification transmission line described above, the result obtained by measuring the refractive index profile of each optical fiber in the range from −1500 μm to +1500 μm while setting the fusion splicing point corresponding to the fusion splicing point C2 shown in the upper part of FIG. 4 to 0 μm as a reference, and then calculating the MFDs from the measured refractive index profiles. In the view shown in the lower part of FIG. 4, Graph G410 shows the calculated value of the MFD in the 1.55 μm wavelength band, and Graph G420 shows the calculated value of the MFD in the 0.98 μm wavelength band. The plus sign on the horizontal axis indicates the side from 0 μm indicating the fusion splicing point toward the EDF 100, and the minus sign indicates the side from 0 μm of the fusion splicing point toward the WDMF 300. As can be seen from this lower part of FIG. 4, in the transition section R1 of the EDF 100 from near +500 μm to 0 μm, the MFD increases to the extent that it exceeds the MFD of the WDMF 300 toward the fusion splicing point C2. On the other hand, the MFD of the WDMF 300 also increases toward the fusion splicing point C2.

Next, the table in FIG. 5 will be explained. Regarding the signs in FIG. 5, a positive region indicates an increase of the fusion splicing loss with respect to the reference, while a negative region indicates the decrease of the fusion splicing loss with respect to the reference. To obtain the table shown in FIG. 5, the prepared conventional EDF has an MFD of 5.7 μm, corresponding to the point A shown in the upper part of FIG. 2. The prepared EDF 100, serving as a heavily Al-doped EDF, has an MFD of 5.0 μm, corresponding to the point B shown in the upper part of FIG. 2. Regarding the fusion splicing loss of each of them, it can be seen that the heavily Al-doped EDF is effective for PCE of the EDFA because the fusion splicing loss of the heavily Al-doped EDF reduces as compared with the conventional EDF such that the MFD of the EDF 100, which is applicable to the optical amplification transmission line of the present disclosure, is −1.27% when the MFD of the conventional EDF is set as a reference value.

The fusion splicing loss was also examined at the fusion splicing point C2 between the EDF 100 and the WDMF 300. The prepared WDMF 300 has the MFD of 7.0 μm. With the fusion splicing loss at each of the signal light wavelength of 1.55 μm and the pumping light wavelength of 0.98 μm, it was observed that the fusion splicing loss at the point B with reference to the fusion splicing loss at the point A increased by 0.1% at the pumping light wavelength of 0.98 μm but improved by 0.12% at the signal light wavelength of 1.55 μm. This is indicated by "−0.12%" in the table in FIG. 5. As can be seen from the sum of the fusion splicing loss between the EDF 100 and the WDMF 300 and the fusion splicing loss between the EDF 100 and the SMF 200, the increase of the PCE due to the fusion splicing loss in the optical amplification transmission line using the conventional EDF is suppressed.

As described above, in the heavily Al-doped EDF applicable to the optical amplification transmission line of the present disclosure, a tapered core can be easily formed by thermal diffusion, and therefore, the fusion splicing loss can be controlled appropriately even if the difference between the MFD of the heavily Al-doped EDF and that of the SMF is large. As an appropriate range of fiber composition, the Al concentration in the core is 4.0% or more and 5.0% or less by mass fraction, the Ge concentration is less than or equal to the concentration in the SMF, i.e., less than 3.5% by mass fraction, and the F concentration in the optical cladding is −0.50% or more and −0.30% or less, preferably −0.40% or more and −0.30% or less in terms of relative refractive index difference Δ. It is effective that the MFD of the heavily Al-doped EDF is 5.0 μm or more and 5.3 μm or less. As is clear from the results, the Ge concentrations in both of the SMF and the heavily Al-doped EDF are comparable, and the MFD of the SMF has a fluctuation range of less than 0.1 μm, indicating that the contribution of Ge diffusion is almost negligible.

REFERENCE SIGNS LIST

100 . . . EDF
100a . . . Optical output end face
100b . . . Optical input end face
110 . . . Core
120 . . . Cladding
200 . . . SMF
200a . . . Optical output end face
200b . . . Optical input end face
210 . . . Core
220 . . . Cladding
300 . . . WDMF
500 . . . Pumping light source
C1, C2 . . . Fusion splicing point
R1 . . . Transition section
R2 . . . Stationary section
P . . . Pumping light
S . . . Signal light

What is claimed is:

1. An optical amplification transmission line, comprising:
an amplification optical fiber having a first end face, a second end face, a first core extending from the first end face toward the second end face and doped with erbium, and a first cladding surrounding the first core and doped with fluorine; and
a transmission optical fiber transmitting only single-mode light and having a third end face fusion-spliced to the first end face, a fourth end face, a second core extending from the third end face toward the fourth end face without being doped with erbium, and a second cladding surrounding the second core, wherein
the amplification optical fiber includes a transition section which includes the first end face and has a first mode field diameter decreasing from the first end face toward the second end face, and a first stationary section which communicates the transition section and the second end face and in which a composition of the amplification optical fiber and the first mode field diameter are constant from the transition section toward the second end face,
the transmission optical fiber includes a second stationary section in which a composition of the transmission optical fiber and a second mode field diameter are constant from the third end face toward the fourth end face, and
a ratio (MFD2/MFD1) of MFD2 serving as the second mode field diameter of the second stationary section to MFD1 serving as the first mode field diameter of the first stationary section is 1.9 or more and 2.2 or less.

2. The optical amplification transmission line according to claim 1, wherein the first core is doped with germanium and aluminum.

3. The optical amplification transmission line according to claim 2, wherein the MFD1 is 5.3 μm or less in a 1.55-μm wavelength band.

4. The optical amplification transmission line according to claim 2, wherein in the first core, a concentration of the germanium is 3.8% or less by mass fraction, and a concentration of the aluminum is 4.0% or more by mass fraction.

5. The optical amplification transmission line according to claim 4, wherein the MFD1 is 5.3 μm or less in a 1.55-μm wavelength band.

6. The optical amplification transmission line according to claim 2, wherein a relative refractive index difference of the first core with respect to the first cladding is 1% or more and 2% or less.

\* \* \* \* \*